United States Patent [19]
DeCaluwe et al.

[11] Patent Number: 4,753,467
[45] Date of Patent: Jun. 28, 1988

[54] MOVABLE MOLDING FOR A VEHICLE

[75] Inventors: Mary E. DeCaluwe, Southfield; Edgar J. Pierce, Mt. Clemens, both of Mich.

[73] Assignee: Chrysler Motors Corporation, Highland Park, Mich.

[21] Appl. No.: 15,765

[22] Filed: Feb. 17, 1987

[51] Int. Cl.$^4$ .............................................. B60R 19/42
[52] U.S. Cl. ............................... 293/126; 293/124; 293/141; 293/154; 293/155; 293/128; 403/160; 403/166
[58] Field of Search ............... 293/120, 121, 124, 126, 293/128, 141, 149, 151–155; 403/160, 166

[56] References Cited

U.S. PATENT DOCUMENTS

| 3,861,728 | 1/1975 | Haberle et al. | 293/126 |
| 4,063,830 | 12/1977 | Ban | 403/166 X |
| 4,401,331 | 8/1983 | Ziner et al. | 293/128 |
| 4,629,232 | 12/1986 | Zimlich et al. | 293/128 |
| 4,671,551 | 6/1987 | Walsh et al. | 293/126 |
| 4,695,084 | 9/1987 | Hlavach | 293/126 |

FOREIGN PATENT DOCUMENTS

| 2728026 | 10/1978 | Fed. Rep. of Germany | 293/149 |
| 1188028 | 10/1985 | U.S.S.R. | 293/149 |

*Primary Examiner*—Dennis H. Pedder
*Attorney, Agent, or Firm*—Edward A. Craig

[57] ABSTRACT

A movable molding is provided for a vehicle on the vehicle body adjacent to a wrap-around end portion of the bumper. The molding and end portion of the bumper have mating abutment walls through which these elements are fastened together. When the bumper moves towards the vehicle upon impact, the molding is thereby caused to move therewith. Slide elements are provided between the molding and vehicle body for sliding of the molding along the body. A fastening element attaches the molding to the bumper end portion. The fastening element comprises a tensioned flexible cable which permits vertical movement of the bumper end portion with respect to the molding.

2 Claims, 2 Drawing Sheets

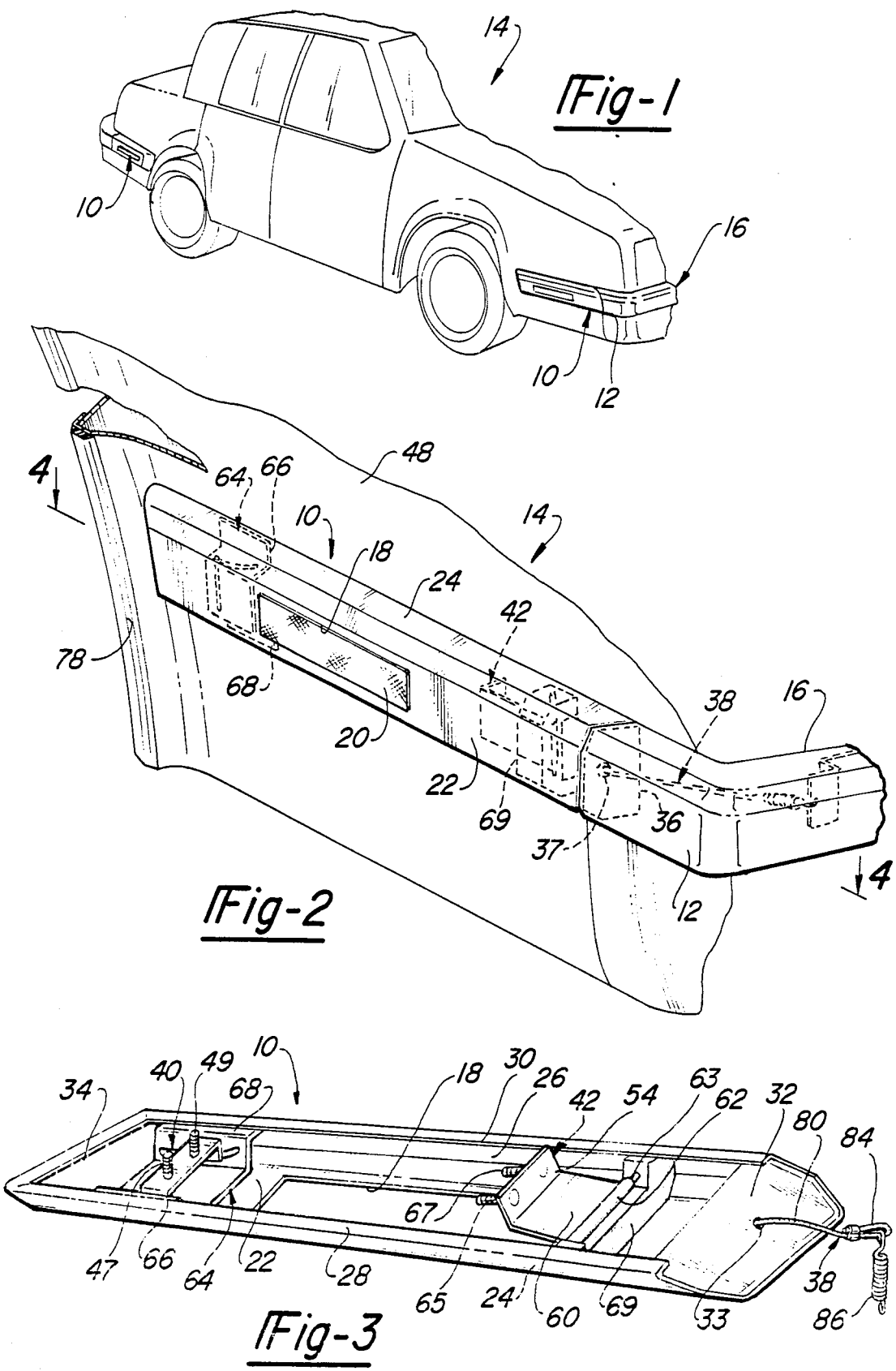

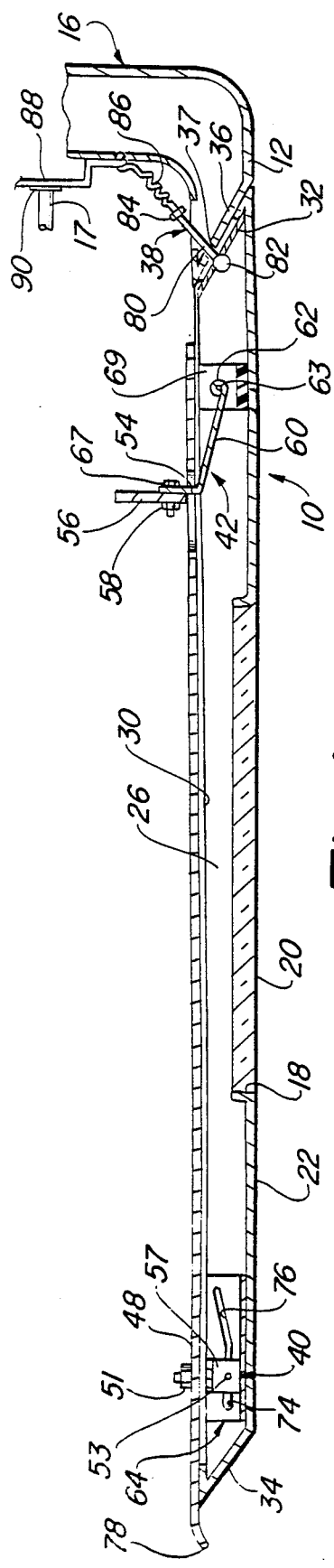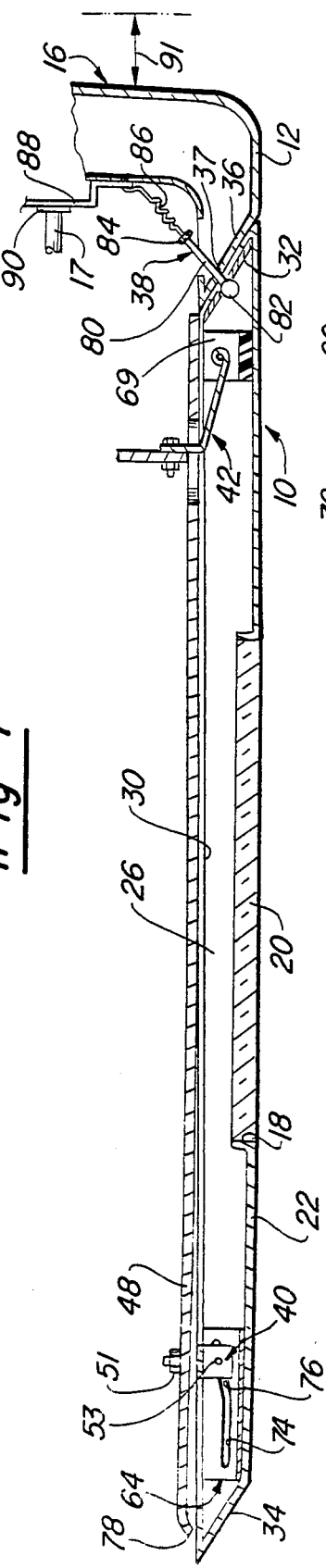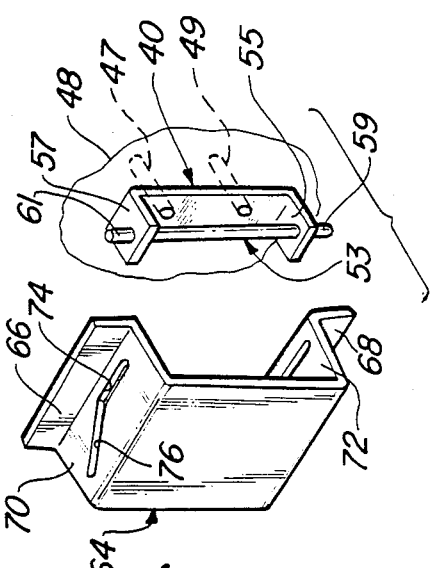

MOVABLE MOLDING FOR A VEHICLE

RELATED APPLICATIONS

This application relates to Ser. No. 06/939,195, filed Dec. 8, 1986.

BACKGROUND OF THE INVENTION

1. Field of the Invention

This invention relates to a movable vehicle molding slidably mounted on a vehicle and directly connected to a bumper to move therewith. Fastening means are used for this connection which permit vertical movement of the bumper with the molding remaining stationary.

2. Prior Art

Government regulations have mandated that front and rear bumpers of vehicles be so constructed and mounted as not to be damaged as a consequence of low speed impact with other vehicles or fixed structure. The prevailing method for accomplishing this has been to mount the bumper onto the vehicle by means of an energy absorbing device, such as a shock absorbing structure. When the bumper is impacted at low speeds, the energy absorbing device collapses, absorbing the energy of impact. This collapse takes with it the bumper which moves toward the vehicle. After being impacted, the energy absorbing devices bias the bumper back to its normal position.

One problem which has been encountered in connection with such structures is the maintenance of the integrity of moldings typically provided on the fenders of vehicles adjacent to and in-line with wrap-around end portions of the bumpers which extend around the sides of the vehicles. As the bumper is moved toward the vehicle, the wrap-around end portions also, of course, move. These end portions will impact moldings which are mounted on the fenders closely adjacent thereto. If the moldings are rigid pieces, and rigidly mounted they will be damaged upon impact with the end portions of the bumper.

One solution to this problem has been the use of flexible moldings. When such moldings are impacted, they deform without damage. Upon retraction of the bumper after impact, such moldings may be straightened out by hand or may return to normal position as a consequence of inherent resiliency. Examples of such moldings are illustrated in U.S. Pat. Nos. 3,937,508 and 4,059,301.

It has been desired to use a molding fabricated of rigid material. Such a molding will not, of course, flex upon being impacted by an end portion of a bumper. It is necessary that such rigid molding not be damaged by the bumper upon impact. In accordance with these needs, spring mounting means, as disclosed in U.S. Pat. No. 4,629,232, issued Dec. 16, 1986, are provided to permit outward deflection of the molding upon bumper movement, with the end portions of the bumper sliding beneath the molding thereby avoiding damage to the molding.

However, this construction has one disadvantage. There is frequently a small amount of permanent bumper set after impact. Therefore, the molding has to be offset from the bumper a short distance so that it can return to its initial position after the bumper retracts to a position which is closer to the molding than the initial position of the bumper because of the small amount of permanent bumper set. This requires a short empty space or gap to be provided between the adjacent ends of the molding and bumper. This gap is considered to be aesthetically objectionable.

In accordance with another approach as disclosed in U.S. patent application Ser. No. 06/911,545, filed Sept. 25, 1986, now U.S. Pat. No. 4,685,712, issued Aug. 11, 1987, urged, telescoping extension adjacent the bumper. This permits limited reduction in molding length upon impact of the bumper with the molding prior to deflection of the molding. Any permanent set of the bumper is taken up by the telescoping extension. This permits the molding to be mounted closely adjacent to the bumper end with no gap between these elements.

In accordance with the present invention, a slidable molding is provided with a simple cam arrangement which causes the molding to deflect and pass over outwardly of the projecting vehicle body structure without damage. The molding is directly connected to the bumper, thus leaving no gap therebetween. Novel fastening means are used for this connection to promote ease of assembly and permit vertical movement of the bumper while the molding remains stationary. Thus, if the bumper is moved up or down upon impact, it will not damage the molding.

SUMMARY OF THE INVENTION

A movable molding for a vehicle having a body and a bumper mounted on one of the forward and rearward ends thereof is provided. Energy absorbing structure mounts the bumper to the vehicle. The energy absorbing structure biases the bumper to a normal position but permits movement of the bumper toward the vehicle upon impact. The bumper has an end portion extending around a side of the vehicle body.

The molding comprises a relatively rigid element having an underside and exterior side. The molding lies on the exterior of the vehicle body in alignment with, and adjacent to, the bumper end portion. Fastening means secure the molding to the bumper end portion. Slide element means are connected to the vehicle body. One of the slide element means and molding have projection structure thereon and the other of the slide element means and the molding has longitudinally extending recess means thereon. The projection structure is received within the recess means and maintains the molding in position relative to the vehicle body while permitting the molding to slide in the direction of the bumper movement. The bumper end portion is adapted to move the molding on the slide element means when the bumper is moved toward the vehicle upon impact and move the molding back to its original position upon retraction of the bumper end portion after impact.

The molding has opening means in the end thereof adjacent to the bumper end portion. The bumper end portion has opening means therein. The fastening means comprises a flexible cable including tension means extending through the opening means in the molding and the opening means provided in the bumper end portion. The cable is secured at one end to the molding and at the other end to the bumper. The tension means is preferably a coil spring. The cable is in tension so as to place the molding in abutting relationship with the bumper end portion but accommodating vertical movement of the bumper end portion upon impact, with the molding remaining vertically stationary.

The slide element means includes a first bracket fixedly fastened to the vehicle body at a point adjacent to the end of the molding remote from the bumper end portion. Projection structure extends outwardly from the first bracket. A second bracket is secured to the molding. The second bracket includes an elongated slot structure which slidably receives the projection structure of the first bracket. A first portion of the slot structure is closely adjacent to the end of the molding remote from the bumper end portion and extends longitudinally with respect to the molding so that the molding will slide only longitudinally upon first being moved by the bumper end portion. A second portion of the slot structure extends from the first portion at an angle towards the vehicle body and bumper end portion so that the end of the molding remote from the bumper end portion will slide longitudinally and away from the vehicle body after the first movement of the molding.

BRIEF DESCRIPTION OF THE DRAWINGS

FIG. 1 is a view in perspective of a portion of a car with the movable molding forming one embodiment of the present invention illustratively mounted on the right hand front and rear fenders;

FIG. 2 is a view in perspective of the movable molding mounted on the right hand front fender of FIG. 1 on an enlarged scale;

FIG. 3 is a perspective view of of the underside of the molding structure;

FIG. 4 is a sectional view taken substantially along the line 4—4 of FIG. 2 looking in the direction of the arrows;

FIG. 5 is a view similar to FIG. 4 with the molding having been moved by the bumper; and FIG. 6 is a view in perspective of slide element means provided for the molding structure.

DETAILED DESCRIPTION OF A PREFERRED EMBODIMENT

Referring to FIG. 1, it will be noted that the movable molding 10 in accordance with the present invention is mounted on the side of the right front fender of an automobile 14. A similar molding 10 is mounted on the right rear fender. Mirror image moldings are normally mounted on the opposite or left-hand side of the automobile 14. It will be noted that the molding 10 is mounted in-line with and adjacent to the end portion 12 of the front bumper element 16. This portion extends around the side of the vehicle.

The bumper elements 16 are mounted on the automobile 14 for movement relative to the automobile body upon impact. Energy absorbing devices, such as shock absorbers 17 shown in FIGS. 4 and 5, are provided to mount and bias the bumper elements to a normal position such, for example, as illustrated in the previously mentioned U.S. Pat. Nos. 3,937,508 and 4,059,301. The specific type of energy absorbing device is not germane to the present invention, the present invention functioning with various styles of such devices. The energy absorbing devices permit movement of the bumper a short distance toward the vehicle on which they are mounted after a low speed impact with another vehicle or stationery structure without appreciable damage to the bumper structure. After the impacting force is dissipated, the bumper structure is returned to its original position by the energy absorbing devices. However, in some cases of greater impact, the bumper structure may have a small amount of permanent set and consequently not return to its original position.

The movable molding of the present invention is designed to accommodate limited bumper motion without damage to the molding or adjacent vehicle body structure. The molding 10 is a relatively rigid trim piece designed to stylistic merge with the front bumper element. The molding 10 includes a rectangular opening 18 which surrounds a lens 20, usually amber in color, which is mounted on the automobile body structure. A lamp is provided behind the lens to illuminate the lens when the vehicle lights are energized. Such lamps are commonly referred to as "fender marker lamps" and the molding 10 as a "marker surround".

The molding 10 may be fabricated as, for example, a stamped brass element. The molding 10 is elongated in the direction of the length of the automobile 14. It includes an exterior side comprising an outer wall portion 22 from the edges of which depend side wall portions 24, 26 which space the outer wall portion 22 from the automobile body structure. The side wall portions 24, 26 terminate in inwardly turned flange portions 28, 30. The end of the molding adjacent to the bumper end portion 12 is provided with an abutment wall 32. An opening 33 is provided in the wall 32. The end of the molding 10 remote from the end portion 12 is closed by means of a wall 34. The bumper end portion 12 has a mating abutment wall 36 which has an opening 37. The walls 32, 36 abut against each other, being pressed together by fastening means 38 as will be later described. As will be noted, no space is provided between the walls 32, 36. Such a space, which is visually objectionable, is normally needed to accommodate bumper movement but is avoided in the present construction.

The molding 10 lies on the exterior of the vehicle body and is held in place by slide element means which are connected to the vehicle body. The slide element means comprise a pair of bracket structures 40, 42. One of these structures 40 is U-shaped. The structure 40 is secured to vehicle body structure 48 by means of a pair of threaded studs 47, 49 which receive nuts 51. The studs 47, 49 are secured in place as by clinching. A pin 53 extends through openings in bracket walls 55, 57 and passes therebeyond to define outwardly extending projections 59, 61. The other bracket structure 42 is L-shaped and has a plate 54 which is secured to vehicle body structure 56 by means of a pair of threaded studs 65, 67 which receive nuts 58. The studs 65, 67 are secured in place as by clinching. A second plate 60 extends outwardly from one end of the plate 54 and terminates in a curled portion 62 which surrounds a pin 63. The ends of the pin 63 extend beyond the curled portion 62 and are pivotally received in openings provided in U-shaped slide element 69. Element 69 is slidably received in the molding 10 and guides the molding in its sliding action while retaining the molding 10 in its vertical relationship with the car.

The other end of the molding 10 is slidably mounted on the bracket 40 by means of a second bracket 64. the bracket 64 is U-shaped and has flanges 66, 68 which are secured to the molding 10 as by welding to fix the bracket 64 in place. Slots which receive the pin ends 59, 61 are provided in the sidewalls 70, 72 of the bracket. Each slot comprises a first horizontal portion 74 positioned closely adjacent to the end of the molding 10 remote from the bumper end portion 12 and extending longitudinally with respect to the molding 10 so that the molding will slide only longitudinally upon first being moved by the bumper end portion 12. As will be noted in FIG. 4, the pin 53 is initially positioned somewhat centrally of the slot portion 74 which is longer than necessary to provide for the sliding action. This extra length aids in assembly, offsetting mounting location variation.

A second slot portion 76 extends from portion 74. Slot portion 76 extends from slot portion 74 at an angle towards the vehicle body 48 and bumper end portion 12 so that the end of the molding 10 remote from the bumper end portion 12 will slide longitudinally away from the vehicle body after the first movement. This results in the end of the molding missing raised vehicle body structure, illustratively a fender lip 78 as shown in FIG. 5.

The fastening means 38 which secure the molding 10 to the bumper end portion 12 are best illustrated in FIGS. 3, 4 and 5. As will be noted, the fastening means includes a flexible cable 80, such as wire strand, which passes through the openings 33, 37. A small ball 82 is attached to the inner end of the cable. The diameter of the ball 82 is larger than the diameter of the opening 33 with the result that when tension is applied to the cable it will pull the molding 10. The outer end of the cable 80 is formed into a loop 84. One end of a coil spring 86 is attached to the loop 84. The other end of the spring 86 is attached to a bracket 88. The end plate 90 of the shock absorber 17 is also secured to the bracket 88. The backet 88 in turn is secured to the bumper 16.

The combined length of the cable 80 and untensioned spring 86 are selected so that it is necessary to stretch the spring 86 to permit it to be attached to the bracket 88. This results in applying pulling tension to the molding 10 to place the molding in abutting relationship with the bumper end portion 12 as shown.

As will be appreciated, with the structure thus described, the molding 10 will move in whatever direction, that is forward or backward, the bumper structure moves. It is pushed backward by the bumper and pulled forward by the fastening means. As shown in FIG. 5, the bumper and molding are moved a distance represented by the arrow 90. After impact, the bumper and molding will move back to the position shown in FIG. 4 with the bumper being moved back by the shock absorber 17 and the molding being pulled back by the fastening means 38. During the first movement, the molding 10 is cammed outwardly as shown in FIG. 5 to avoid damaging the outward projecting lip 78.

We claim:

1. A movable molding for a vehicle having a body and a bumper mounted on one of the forward and rearward ends thereof, absorbing structure mounting the bumper to the vehicle, said energy absorbing structure biasing the bumper to a normal position but permitting movement of the bumper toward the vehicle upon impact, said bumper having an end portion extending around a side of the vehicle body, said molding comprising a relatively rigid element having an underside and an exterior side, the molding lying on the exterior of the vehicle body in alignment with and adjacent to, said bumper end portion, fastening means securing the molding to said bumper end portion, slide element means connected to the vehicle body, the molding being, with respect to the length of the vehicle, slidably received on the slide element means, the slide means maintaining the molding in a fixed vertical position relative to the vehicle body while permitting the molding to slide longitudinally relative to the vehicle body, the slide element means including slide element structure positioned adjacent to the bumper end portion, said slide element structure including a substantially L-shaped bracket having a first plate, fastening means securing said first plate to vehicle body structure, a second plate extending outwardly from one end of the first plate, said second plate terminating in a curled portion, a pin surrounded by said curled portion, the ends of the pin extending beyond the curled portion, a U-shaped slide element slidably received in the molding to guide the molding in its sliding action while retaining the molding in its vertical relationship with the vehicle body, the ends of said pin being pivotally received in openings provided in said U-shaped slide element, the bumper end portion adapted to move the molding on the slide element means when the bumper is moved towards the vehicle upon impact and move the molding back to its original position upon retraction of the bumper end portion after impact, the molding having opening means in the end thereof adjacent to the bumper end portion, the bumper end portion having opening means therein, the fastening means comprising a flexible cable including tension means, the cable extending through the opening means in the molding and the opening means provided in the bumper end portion, the cable being secured at one end to the molding and at the other end to the bumper, the cable being intension so as to place the molding in abutting relationship with the bumper end portion but accommodating vertical movement of the bumper end portion upon impact, with the molding remaining vertically stationary.

2. A movable molding as in claim 1, further characterized in that the tensioning means comprises a coil spring.

* * * * *